United States Patent

[11] 3,570,787

[72] Inventor Bernhardt Stahmer
    1509 Chicago St., Omaha, Nebr. 68102
[21] Appl. No. 756,683
[22] Filed Aug. 30, 1968
[45] Patented Mar. 16, 1971

[54] HELICOPTER COLUMN FOR SUPPORTING MULTIBLADE ROTORS AND SUMMIT LOADS
9 Claims, 2 Drawing Figs.

[52] U.S. Cl. .................................................. 244/17.23
[51] Int. Cl. ...................................................... B64c 27/08
[50] Field of Search ............................................ 89/36;
    170/135.28; 244/17.5, 17.17; 244/17.11, 17.19, 17.23

[56] References Cited
UNITED STATES PATENTS

| | | | |
|---|---|---|---|
| 977,997 | 12/1910 | Bertholf | 244/17.21X |
| 994,966 | 6/1911 | Woodington | 244/17.21 |
| 1,023,233 | 4/1912 | Williams | 244/17.15 |
| 1,940,108 | 12/1933 | Sweet | 244/17.15 |
| 1,020,945 | 3/1912 | Chase | 244/17.15 |
| 1,160,473 | 11/1915 | Warner | 244/17.17 |
| 1,345,101 | 6/1920 | Perry | 244/17.17 |
| 1,739,703 | 12/1929 | Winterkorn | 244/17.11 |

*Primary Examiner*—Milton Buchler
*Assistant Examiner*—Paul E. Sauberer
*Attorney*—George R. Nimmer ABSTRACT: This invention relates to a helicopter aircraft comprising a hollow fuselage and a stationary lofty upright column attached to the fuselage and extending loftily upwardly from the fuselage roof along a vertical axis, the lofty column being both adapted to rotatably support at least one substantially horizontal multiblade rotor thrust means and also adapted to support a weighty load at the column summit. The lofty column is desirably of a tubular configuration having two vertically-aligned tubular segments, including a lateral access opening into the lower segment from the fuselage interior, a multiblade rotor thrust means attached to each segment with the respective rotors being adapted to rotate in opposed directions about the column vertical axis, and platform means at the column summit adapted to carry a weighty load such as warfare weaponry.

INVENTOR
BERNHARDT STAHMER

HELICOPTER COLUMN FOR SUPPORTING MULTIBLADE ROTORS AND SUMMIT LOADS

It is a general object of the present invention to provide a helicopter aircraft having a lofty upright column extending above the fuselage roof whereby weighty loads might be supported at the column summit.

It is a specific object of the present invention to provide a helicopter aircraft having a stationary nonrotatable lofty upright column with at least one substantially horizontal multiblade rotor thrust means revolvably secured thereto.

It is another object of the present invention to combine both the thrust means and the stabilizing means for a helicopter aircraft within substantially horizontal multiblade powered rotors rotating about a central vertical axis of the fuselage.

It is a further object to provide a defense capability for a warfare type helicopter aircraft, and specifically at the summit of the lofty column.

It is another object to provide a helicopter lofty column wherein it is possible for operating personnel to ascend to the column summit commencing from within fuselage, and preferably without exposing themselves as a prominent target to enemy fire.

It is a further object to provide a thrust means for a warfare-type helicopter that is comparatively resistant to enemy fire and that is exceedingly adaptable for repair and maintenance.

It is another object to provide an improved power source and fuel supply for the horizontal multiblade rotor thrust means.

It is a further object to provide an exceedingly versatile and defensible helicopter apparatus that is adaptable for serial reconnaissance, cargo and personnel transport, evacuation, and for limited offensive operations.

It is another object to provide a helicopter apparatus having the capability to carry unusually heavy cargo weights whereby the helicopter might function for ship-to-share loadings and unloadings, for forestry and lumber transportation, and for similar cargo carrying over normally inaccessible earth surfaces.

With the above and other objects and advantages in view, which will become more apparent as this description proceeds, the helicopter column for supporting powered rotor blades and summit loads of the present invention comprises the novel configuration, combination, and arrangement of element, reference being had to the accompanying drawing wherein like numbers refer to like parts in the several views and in which.

Figure 1:
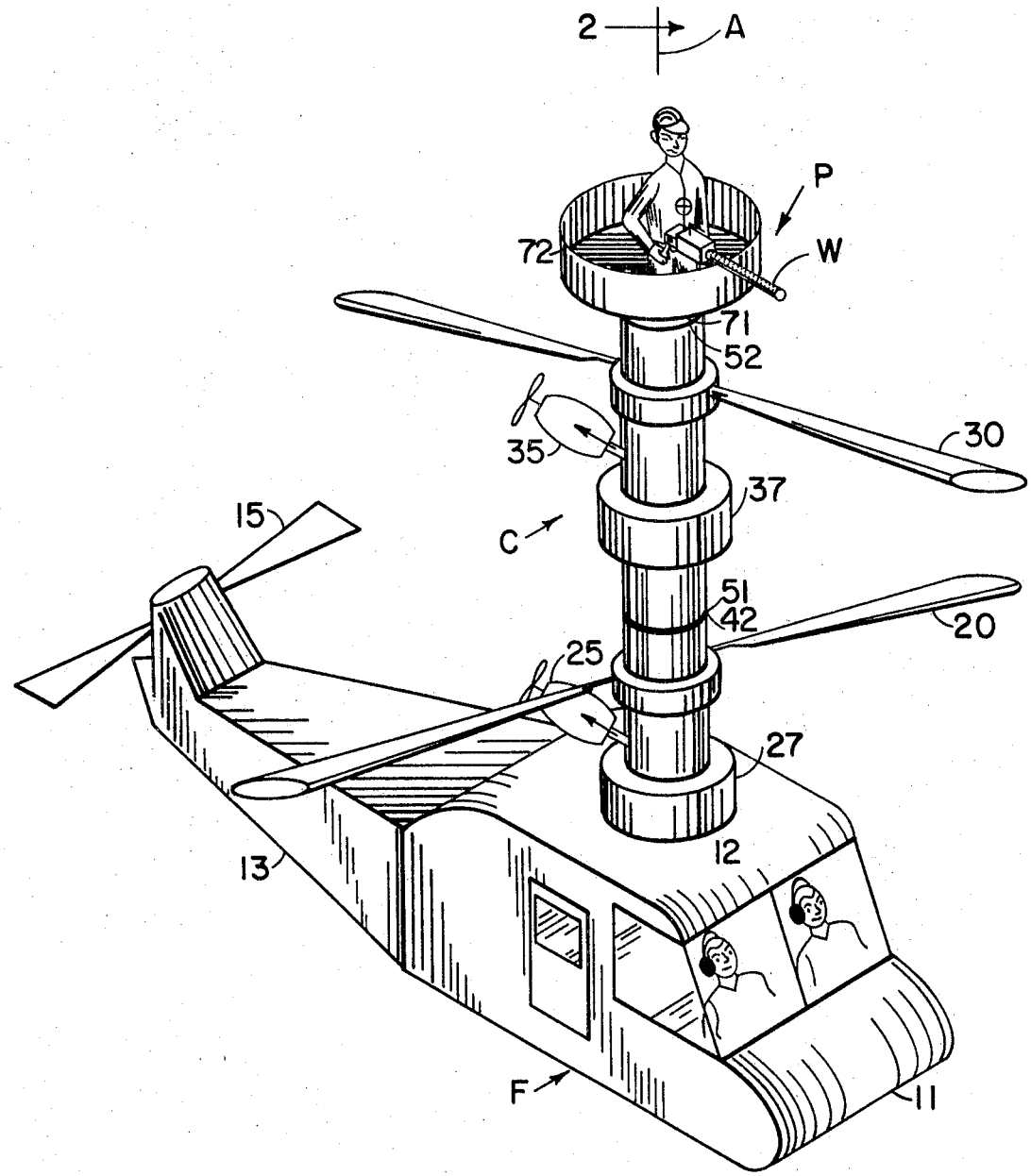
FIG. 1 is a perspective view of the helicopter column for supporting powered rotor blades and summit loads of the present invention.

The helicopter column for supporting powered rotor blades and summit loads (sometimes hereinafter referred to as columned-helicopter) comprises the basic workings of a helicopter aircraft of the type having a hollow fuselage F adapted to carry cargo and personnel therein said fuselage F including a forward end 11, a roof 12, and a substantially horizontal floor 13. Conventionally, helicopter-type aircraft are provided with thrust means typically comprising at least one substantially horizontal multiblade powered-rotor e.g. 20, disposed above fuselage roof 12 and rotatably mounted with respect to the fuselage about a vertical axis A passing uprightly through the fuselage. Typically, vertical axis A is disposed reasonably near, and substantially at, the center of gravity of fuselage F. Conventionally also, helicopter-type aircraft are provided with rearwardly-positioned powered stabilizing means, such as the generally upright powered propeller 15 rotatably attached to the fuselage rearwardly-extending boom 14.

This invention relates to a lofty upright column C disposed axis A and extending loftily above fuselage roof 12, said column C being adapted to perform two important independent function: to revolvably support above roof 12 at least one, and preferably two, substantially horizontal multiblade powered rotor; and to support a weighty load at the column summit e.g. as weaponry W. At least that portion of Column C extending above fuselage roof 12 is stationary and nonrotatable with respect to fuselage F and axis A, and preferably, column C is securely removably fastened to fuselage floor 13 as with bolts 16, Column C thence extending upwardly from floor 13 through an opening in roof 12.

This invention fundamentally includes at least one substantially horizontal multiblade powered rotor 20 as a thrust means above fuselage F. on column C. For example, a first thrust means as a dual-blade rotor 20 is rotatably attached, as by means of circular collar 21, to an annular ball bearing unit 22 which surrounds and is nonrotatably attached to column C at lower segment 40. The powering means for dual-blade rotor 20 might take the exceedingly compact and efficient form comprising a power means such as a turbojet engine 25, shown schematically in the drawing. The rotatable shaft of power means 25 is actuatably connected through spur gear 26 to the gearlike annular lower surface 23 of collar 21. The fuel tank 27 for turbojet engine 25 might take the compact annular form of FIG. 2 surrounding axis A and column C, said fuel tank 27 resting upon fuselage roof 12.

Upright column C is desirably of the dual-segment construction shown in the drawing, including lower segment 40 having its upper end 42 removably attached to the lower end 51 of upper segment 50 as by means of intersegments band 47 and bolts 46 to ensure nonrotatability of upper segment 50 with respect to axis A as well as to nonrotatable lower segment 40. The vertical distance between fuselage roof 12 and the intersegments juncture 42 is substantially equal to the vertical distance between said intersegments juncture and upper segment upper and 52 i.e. the column summit. A second substantially horizontal multiblade rotor 30 is rotatably attached, as by means of circular collar 31, to an annular ball bearing unit 32 which surrounds and is nonrotatably attached to upper segment 50 of column C. The powering means for dual-blade rotor 30 is similar to that for first rotor 20 including turbojet engine 35 and its spur gear 36, a gearlike annular lower surface 33 on collar 31, and annular fuel storage tank 37 attached as by welding to upper segment 50. Rotors 20 and 30 are rotatable in opposite directions, and the blades of each are of selectively variable pitch; with such two independent horizontal rotor thrust means it is possible to stably motivate the helicopter aircraft in all directions, thus dispensing with the need for the conventional rear end thrust means 15.

With the two independent horizontal rotor thrust means described in the previous paragraph, there results a helicopter aircraft having exceedingly versatile warfare capabilities. So long as both horizontal rotors 20 and 30 remain intact, an unusually great thrust means potential is available for lifting the helicopter and cargos carried thereby. If one of the horizontal rotor thrust means should become incapacitated by enemy warfare fire, the remaining rotor would still motivate the aircraft quite well, especially if the rear end thrust means 15 remains intact. Upon reaching its home repair base, the incapacitated rotor could be easily replaced. Replacement of second rotor 30 would be especially facilitated if the second rotor 30, including elements 31—37 and upper column segment 50, are warehoused as integral units, replacement necessitating only the manipulation of bolts 46 and band 47. Cylindrical surfaces for segments 40 and 50, particularly commencing downwardly from their upper ends 42 and 52, facilitate removal of defective rotors 20 and 30.

Weighty loads can be carried at the summit of column C said summit being defined to mean in the alternative: immediately above the second and higher thrust means when two sets of substantially horizontal multiblade rotor thrust means are employed i.e. as at upper segment upper end 52; or, immediately above the first and only thrust means when just one substantially horizontal multiblade rotor thrust means is employed i.e. at substantially position 42. The vertical distance between the summit and the horizontal multiblade rotor thrust means immediately therebelow should not exceed the vertical distance between fuselage roof 12 and floor 13 so as to promote stability of the helicopter aircraft. Also in regard to the stability of the helicopter aircraft, the weight of the load carried at the column summit i.e. above the highest multiblade rotor thrust means, should not exceed the weight of the cargo load carried by the fuselage. The summit load might take the form as cargo removably attached to column C, as observation or military personnel, or as weaponry W together with ammunition and operation personnel therefor as indicated in the drawing. If the summit load takes the form of weaponry W an admirable defense capability results for a warfare-type helicopter aircraft. Moreover, if the weaponry should be in the form of revolvably an pivotably attached machine gun of the conventional type firing in synchronization with the revolving speed of the multiblade rotor 20,30, then a substantially spherical defensive perimeter surrounding fuselage F results.

It is exceedingly desirable that upright column C be of tubular form commencing within fuselage F whereby operating personnel might ascend to the column summit commencing from within fuselage F. In this vane, the inside upright surface of column C would be integrally provided with a plurality of vertically aligned rungs R to provide a ladder means. Preferably the tubular column C is of cylindrical shape surrounding vertical axis A whereby the substantially horizontal multiblade rotor thrust means 20,30, might be readily slidably positioned along and revolvably attached to column C as illustrated in the drawing.

Figure 2:
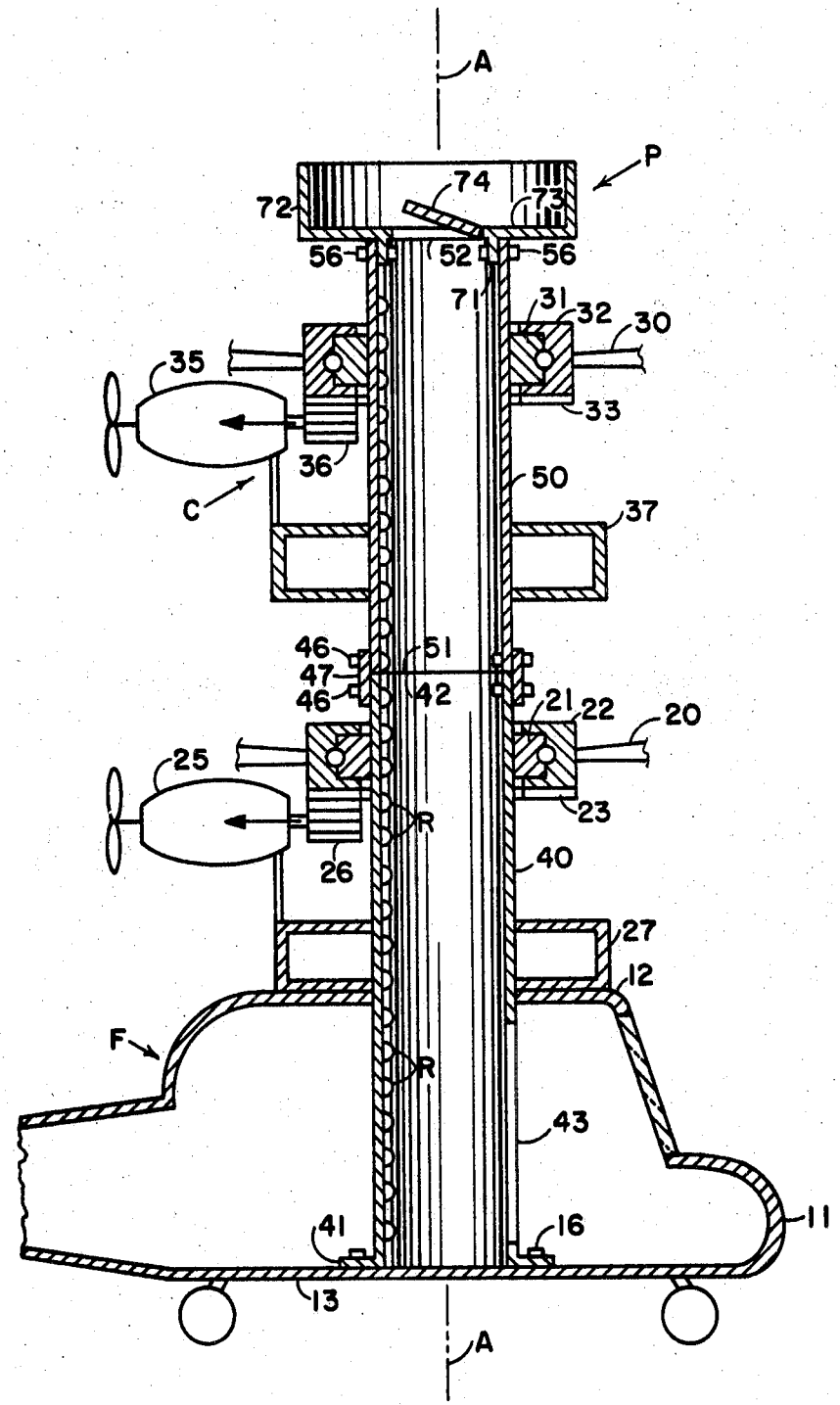
FIG. 2 is a sectional elevational view taken along line 2—2 of FIG. 1.

As is indicated in FIG. 2, the lower cylindrically tubular segment 40 of column C has an outwardly flanged lower end 41 that is attached as by means of bolts 16 to fuselage floor 13, the lower segment upper end 42 being disposed above fuselage roof 12 and above lower thrust means 20. Column C at lower segment 40 has a lateral opening 43 disposed wholly within fuselage F whereby operating personnel within fuselage F might enter the bore of tubular Column C and ascend to the column summit as by ladder means R.

There are platform means P at the column summit to support thereat the summit load. The platform means might take several forms. However, when the preferable cylindrically tubular column is used, the platform means P of FIG. 2 has especially desirable adaptability. Platform means P of FIG. 2 has two concentric tubular portions 71 and 72, each tubular portion being concentric about column axis A and extending in opposite directions of platform floor 73. Specifically, platform lower tubular portion 71 is adapted to be removable slidably inserted within the upright bore of Column C either at 52 or at 42, depending upon the location of the column summit. Removable attachment might be effected by bolts 56. Extending upwardly of platform floor 73 and of larger diameter than platform lower portion 71 is platform upper tubular portion 72 that might offer shieldlike protection to the weaponry operating personnel and to the summit load generally. Alternatively, that portion of platform means P extending upwardly of floor 73 might take the form of a transparent domelike shield, such as is employed to guard to the top-turrent gunner of B-52 bomber aircraft and the like. Platform floor 73 might be provided with a pivotably associated trapdoor to provide a platform opening in vertical registry with the column upright bore, thus facilitating access upon the platform by operating personnel originating from within fuselage F. Platform means P might also include auxiliary flight controls for the columned helicopter, in the event that the fuselage flight controls should become incapacitated.

From the foregoing, the construction and operation of the columned helicopter will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. In a helicopter aircraft of the type having a hollow fuselage including a substantially horizontal floor and a roof and having at least one substantially horizontal powered rotor thrust means disposed above the fuselage roof and rotatably mounted with respect to the fuselage about a vertical axis passing uprightly through the fuselage, the improvement which comprises: a lofty tubular column for revolvably supporting a plurality of multiblade rotors and for also supporting summit loads thereon, said column being disposed along the said vertical axis above the fuselage floor and extending through the fuselage roof whereby the column summit is located loftily above the fuselage roof, said lofty column being nonrotatably attached to the fuselage whereby said column is also nonrotatable with respect to the said vertical axis, said tubular column including a lower opening extending into the fuselage interior, a pair of substantially horizontal multiblade rotors revolvably surrounding the tubular column and including a first upper rotor and a second lower rotor, an independent powering means for each of the two multiblade rotors, the powering means for the first upper rotor being located wholly above the second lower rotor and the powering means therefor, both said rotors being wholly disposed between the column summit and the fuselage roof, platform means disposed at the column summit whereby said helicopter aircraft is adapted to carry a supplemental load including personnel on said platform means externally and above the fuselage hollow interior, and the inside wall of the tubular column being provided with ladder means whereby personnel commencing from the fuselage hollow interior might enter into the tubular column through the said lower opening thereof and ascend to the column summit through said multiblade rotors.

2. The helicopter aircraft column of claim 1 wherein the column includes an upper upright tubular column segment detachably mounted to a lower upright tubular column segment, the juncture of the two column segments being disposed above the fuselage roof, and the platform means having an opening in vertical registry with the column bore to permit personnel to ascend onto the platform means, the upper column segment at the upper end thereof including shieldlike protection for the platform means.

3. The helicopter aircraft column of claim 2 wherein there is a first powered rotor rotatably attached to the lower column segment; and wherein there is a second powered rotor rotatably attached to the upper column segment, said first and second powered rotors being adapted to rotate in opposed directions about the vertical axis.

4. The helicopter aircraft column of claim 3 wherein the vertical distance between juncture of the two column segments and the fuselage roof exceeds the vertical distance between the column summit and the juncture of the two segments; and wherein the respective multiblade rotor thrust means are each independently powered by a turbojet engine, the fuel for each turbojet engine being supplied from an annular fuel tank surrounding the vertical axis.

5. The helicopter aircraft column of claim 4, wherein the inside bore diameter of the two column segments are substantially identical and in vertical registry; and wherein the platform means includes a downwardly extending tubular portion adapted to be slidably inserted into the bore of the column commencing downwardly from the column summit.

6. In a helicopter column aircraft of the type including a substantially horizontal floor and a roof and having at least one substantially horizontal powered rotor disposed above the fuselage roof and rotatably mounted with respect to the fuselage about a vertical axis passing uprightly through the fuselage, the improvement which comprises: a lofty upright column for revolvably supporting a plurality of multiblade rotors, said column including an upper upright column segment detachably mounted to a lower upright column segment, the juncture of the two column segments being disposed above the fuselage roof, a first multiblade rotor rotatably attached to the upper column segment and a second multiblade rotor rotatably attached to the lower column segment, two independent powering means for the two respective multiblade rotors, the powering means for the multiblade rotor on the upper column segment being located above the juncture of the two column segments and attached to the upper column segment remote of the lower column segment.

7. The helicopter aircraft column of claim 6 wherein the independent powering means for each multiblade rotor comprises a turbojet engine, the fuel for each turbojet engine being supplied from an annular fuel tank attached to and surrounding said upright column, the turbojet engine and fuel tank for the multiblade rotor on the upper column segment being located at and attached to said upper column segment remote of the lower column segment.

8. The helicopter aircraft column of claim 7 wherein the multiblade rotors are rotatably connected to the respective column segments with circular collars surroundingly attached to the respective column segments; and wherein the first and second powered multiblade rotors are adapted to rotate in opposed angular directions about the vertical axis of the said upright column.

9. The helicopter aircraft column of claim 6 wherein both column segments are of cylindrically tubular construction with the vertical bore of the segments being in vertical registry; wherein the lower segment includes a laterally extending opening therethrough within the fuselage interior, the said platform means having an opening in vertical registry with the upper segment bore, and the inside walls of the dual-segment tubular column being provided with ladder means whereby personnel from the fuselage interior might ascend to the platform means at the column summit.